United States Patent [19]

Burns et al.

[11] 3,962,606
[45] June 8, 1976

[54] SENSOR FOR A GROUND FAULT CIRCUIT INTERRUPTER

[75] Inventors: Edward P. Burns, Danbury, Conn.; Herbert W. McCord, Warren, N.J.

[73] Assignee: General Signal Corporation, Rochester, N.Y.

[22] Filed: Oct. 9, 1974

[21] Appl. No.: 513,365

[52] U.S. Cl. .......................... 317/18 D; 317/33 SC
[51] Int. Cl.[2] ........................................... H02H 3/28
[58] Field of Search ............... 317/18 D, 31, 33 VR, 317/33 SC; 323/44 R, 45, 91

[56] References Cited
UNITED STATES PATENTS

| | | | |
|---|---|---|---|
| 3,179,875 | 4/1965 | Keats .............................. | 323/45 X |
| 3,419,788 | 12/1968 | May ............................... | 323/45 X |
| 3,505,591 | 4/1970 | Scott .............................. | 323/91 X |
| 3,506,906 | 4/1970 | Nestor ............................ | 317/18 D |
| 3,562,732 | 2/1971 | Genuit ........................ | 317/33 SC X |
| 3,566,189 | 2/1971 | Wilson ........................... | 317/18 D |
| 3,611,035 | 10/1971 | Douglas .......................... | 317/18 D |
| 3,723,814 | 3/1973 | Gross ............................. | 317/18 D |
| 3,731,148 | 5/1973 | Fournis ........................... | 317/18 D |
| 3,736,468 | 5/1973 | Reeves et al. ..................... | 317/18 D |
| 3,852,642 | 12/1974 | Engel et al. ...................... | 317/18 D |

*Primary Examiner*—R. Skudy
*Assistant Examiner*—Parick R. Salce
*Attorney, Agent, or Firm*—Milton E. Kleinman; George W. Killian

[57] ABSTRACT

A ground fault current detection and disconnect device. A differential current sensing transformer is employed together with a second transformer having one winding in series with the neutral conductor and another winding serving as an auto-transformer with a part thereof coupled across the line and netural conductors. The auto-transformer provides an alternating current power supply to a diode bridge, the output of which provides a direct current power supply for an operational amplifier. The output of the sensing winding of the differential transformer is an input to the operational amplifier. When the output of the operational amplifier exceeds a predetermined level, an SCR is triggerred on and a circuit disconnect device, bridged across the line and neutral conductors in series with the anode and cathode of the SCR, opens the power supply to the load. Circuit elements are provided to limit the effects of surge currents and line disturbances. A test switch is provided to introduce a known line unbalance and test the circuit operation and disconnect ability.

10 Claims, 1 Drawing Figure

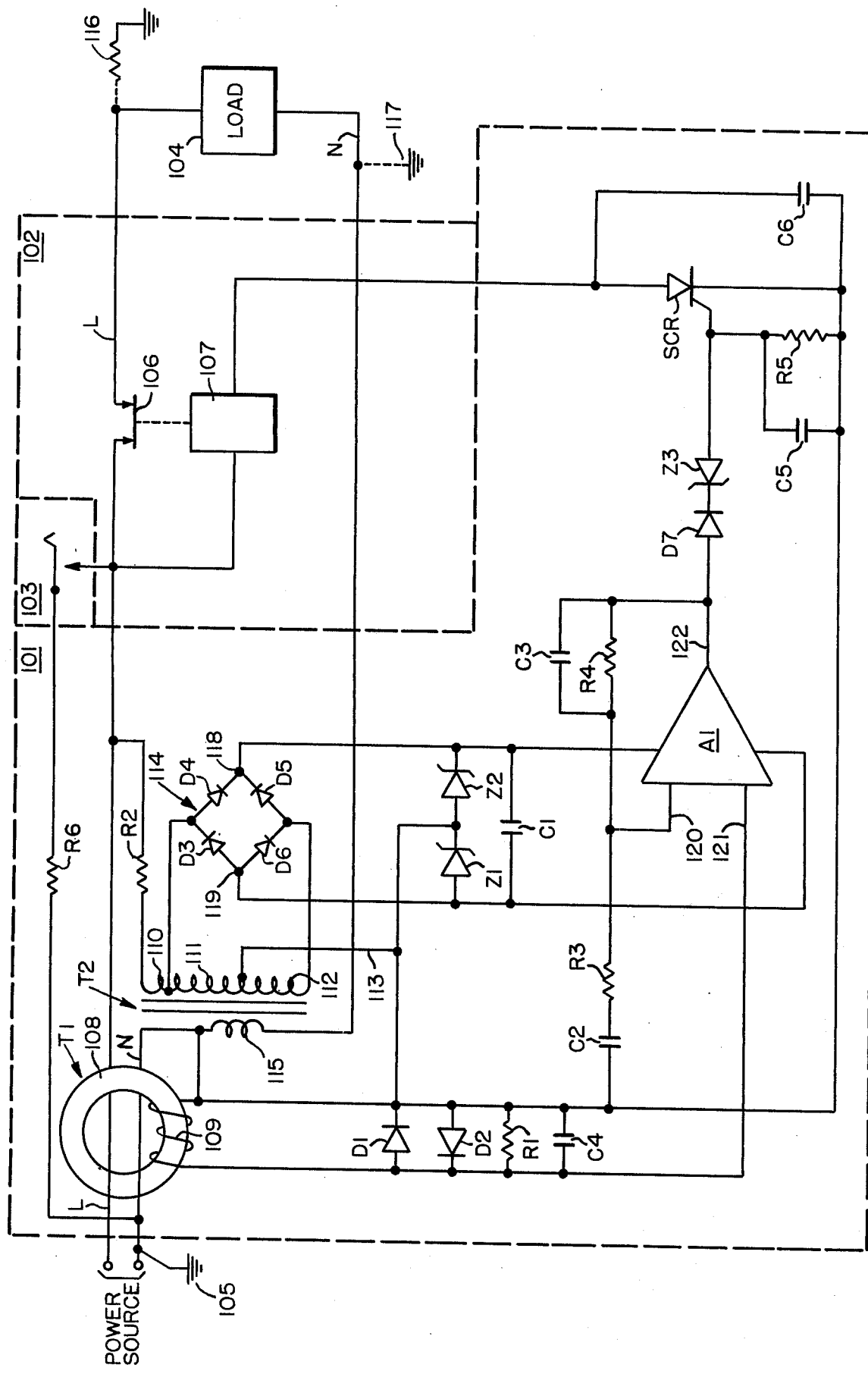

SENSOR FOR A GROUND FAULT CIRCUIT INTERRUPTER

BACKGROUND OF THE INVENTION

Electrically operated devices are so ubiquitous that most people benefit from a wide variety of electrical devices during each day of their lives. Indeed, electrically operated devices have become so common in the home that most modern homes have about forty such devices other than lights. These devices include; alarm clocks, lights, heaters, shavers, radio and television, toasters, oven ranges, toothbrushes, air conditioners, typewriters, calculators, and a wide variety of appliances and tools for the household, kitchens and shop, as well as devices used in connection with leisure hours such as swimming pool filters and lights, grills, rotisseries, fire starters, and many other devices. The wide spread distribution and use of electrical devices greatly increases the possibility of shock and many accidents and deaths resulting from misuse of such devices and-/or from defective and/or worn devices have occured. It has been common practice to provide fusing and/or circuit breakers to provide some protection. However, while fuses and circuit breakers have, for the most part, done an admirable job of protecting equipment, they have failed to provide adequate protection for personnel, inasmuch as people can be seriously and fatally injured by a current which is much smaller than the current which is required to flow to trip a circuit breaker or blow a fuse. Accordingly, various techniques have been employed to try to protect personnel and reduce the probability of electrical shock. One technique, which was introduced years ago and which is now in common usage, involves the use of a grounding wire. The grounding wire (not to be confused with the power conducting grounded wire) is a third wire which is employed to ground the conducting housing of the associated electrical device. The use of a grounding conductor has helped to save many people from serious or fatal electrical shock. However, the use of the grounding conductor has not entirely eliminated the occurance of serious electrical shock. Accordingly, electrical engineering expertise has been used to devise a means to protect personnel by disconnecting power whenever there is an indication tht current exceeding a few milliamperes is flowing elsewhere than in the power conducting leads.

In the normal power distribution circuit the power conducting leads comprise a live conductor and a grounded conductor. If things are functioning properly, the currents in the two conductors are equal. Various techniques have been devised for detecting any difference of current in the live and grounded conductor and for opening the circuit in response to any difference of current. The structure described herein is directed to the class of devices which is intended to be sensitive to any difference of current in a live and grounded conductor and for disconnecting power from the load when there is a difference of current exceeding a predetermined value. Tests have indicated that a difference of more than approximately 5 milliamperes between the current in the live and neutral (grounded) conductors constitutes a possible hazard. Accordingly, a design criteria is to affect disconnection of power to the protected load in response to an unbalanced current of approximately 5 milliamperes.

A differential transformer is a convenient device for detecting an unbalance of current in two wires. In a differential tranformer, each of the wires to be compared couples the transformer with an equal number of turns (usually one) and are wound in sense such that the magnetomotive force generated by each winding exactly cancels the magnetomotive force of the other winding, provided both windings have equal current. A secondary winding is included on the differential transformer and a potential is inducted in this secondary winding whenever there is an unbalanced current in the other windings. The potential induced in the secondary winding has been used to trip circuit breakers and thereby disconnect a load in response to an unbalanced current. This technique requires the use of a sensitive circuit breaker which can respond to the relatively small signal available at the secondary of the differential transformer. Unfortunately, such systems do not respond with sufficient consistency to provide a satisfactory and economical operating technique.

An alternate technique has been proposed using a differential transformer and the induction of a high frequency tickler voltage in the neutral conductor. Another proposed technique involved the use of a means for increasing the difference of current between the live and neutral conductors in response to a small difference therebetween to thereby increase the power available at the secondary of the differential transformer.

The various devices of the prior art suffered from a variety of faults including being too sensitive, not sensitive enough, too costly and too bulky.

SUMMARY OF THE INVENTION

The structure of the present invention provides a circuit breaker for disconnecting the power supply from the load in the event of an unbalanced line current. The circuit breaker is bridged across the power supply instead of receiving its operating energy from the secondary of the differential transformer. A signal from a differential transformer is used to indicate an unbalanced current condition. A power transformer, including an auto-transformer section, is coupled across the power line and provides an A.C. input to a bridge circuit for providing a D.C. power supply to an operational amplifier. The output of the differential transformer is coupled to the input of the operational amplifier. The output of the operational amplifier is coupled to the control gate of a silicon controlled rectifier (SCR). When sufficient voltage appears at the output of the operational amplifier, the SCR will be turned on and the operating coil of a circuit breaker which is bridged across the power conductors, and is in series with the SCR, will conduct and disconnect the power supply from the load. Techniques are employed to prevent nuisance tripping and to protect the various components of the protection circuit.

An unbalance of current in the live and neutral conductors, which comprise the power conductors, usually is the result of one or the other of the power conductors being connected either directly or indirectly to a ground. Accordingly, the protection circuit has come to be known as a ground fault protection circuit. The ground fault conduction circuit may include an individual who has inadvertently come in contact with a power conductor. The possibility of lethal electric shock is greatly increased when the individual is near water, damp earth or plumbing. The widespread use and variety of kitchen appliances and outdoor lights and electrical gadgets greatly increases the hazard possibilities.

It is an object of the invention to provide a new and improved ground fault protection circuit.

It is a more specific object of the invention to provide a ground fault protection circuit wherein the operating coil of the disconnect device is bridged across the power supply.

It is an even more specific object of the invention to provide a ground fault protection circuit employing an operational amplifier, the output of which triggers the disconnect circuit.

It is another object of the invention to provide a ground fault protection circuit wherein disconnects due to transient currents and/or line disturbances are minimized.

It is another object of the invention to provide a ground fault disconnect circuit wherein the sensitivity of the system to ground fault may be readily controlled by the selection of resistor values.

It is another object of the invention to provide a ground fault indicator which is not damaged by large differences of current in the power supply lines.

Additional objects and features which characterize the invention will be apparent as the description of the preferred embodiment is studied together with the accompanying drawing.

BRIEF DESCRIPTION OF THE DRAWING

The drawing comprises a single figure which is a schematic diagram o the circuit of the invention shown in a typical application.

DESCRIPTION OF THE PREFERRED EMBODIMENT

The embodiment shown in the drawing is illustrated in connection with a power distribution system comprising a pair of conductors carrying alternating current power from a power source to a load. Typically, the distributions system will be a conventional 110 to 120 volt alternating current system operating at a line frequency of 60 Hertz. The ground fault detection circuit comprises those components within the largest area enclosed by dotted lines and designated 101 in the upper right hand corner of the boundary. Closely associated with the ground fault detection circuit is a disconnect device which responds to a signal from the ground fault detector to open the circuit between the power source and the load. The disconnect circuit comprises the elements contained within the area enclosed by the dotted lines having the number 102 in the upper right hand corner thereof. In order to test the functioning of the ground fault indicator circuit 101 and the disconnect device 102, a test switch 103 may be provided. Depending upon the circumstances and the particular application wherein the circuit may be used, the ground fault indicating circuit 101, the disconnect device 102 and the test switch 103 might be contained in a single housing. Or the various parts may be combined in other combinations. That is, if an entire branch circuit is to be protected, the ground fault indicating circuit 101 and the test switch 103 might be assembled with, and be an integral part of, the disconnect device 102 which is located at the power distribution center.

The protected load 104 is connected in a manner to be described more fully hereinbelow. The load 104 may comprise any of a wide variety of electrical devices including, but not limited to, lights, motors, heating devices and/or any other electrical device. Alternating current power is connected from the power source to the load, via line conductors L and N which comprise the live and neutral conductors, respectively. The line conductor is also called the line and/or hot conductor; the neutral conductor is also called the ground, grounded and/or earth conductor. The neutral conductor receives its name because it is intended to be at a natural or ground potential. The neutral conductor is electrically connected to a good earth ground at the power source. The connection of the neutral conductor N to the earth at the power source is indicated by the conventional ground symbol 105. The neutral conductor N, sometimes called the grounded conductor, should be grounded only at the power source N. It will be shown that an inadvertent ground on the neutral conductor, at the load end, will trigger the ground fault indicating circuit 101 and cause an actuation of the disconnect device 102. The live conductor L is threaded through the magnetic circuit of the differential sensing transformer T1 and connects through the disconnect device 102 to the load 104. When the disconnect device 102 responds to a ground fault detection, the armature 106 will be pulled down by the energization of the actuator 107 and thereby open the circuit of the live conductor L. This will disconnect the live lead L of the power source from the load 104 and prevent any current, derived from the power source, from passing through any individual which may be in contact with any part of the load 104. The neutral conductor N is also threaded through the magnetic circuit of the differential sensing transformer T1.

The differential sensing transformer T1 comprises three windings on a high permeability toroidal magnetic core 108. Two of the windings, both of which are usually designated primary windings, are connected in series with the input power lines L and N. These primarys, each consisting of a single pass through the hole in the toroidal core 108, are so wound that they induce equal and opposite magnetic flux in the core 108, when the currents in the two conductors L and N are equal. When there is an unbalance of current in the power conductors L and N, normally caused by a ground fault, a net flux in the core 108 is produced. The change in the flux in the core 108 takes place at the 60 Hertz rate and induces a voltage across a third winding 109 which may be called a secondary or sensing winding. The number of turns on sensing winding 109 may assume any convenient value depending upon the requirements of the circuit. Normally the sensing winding may have between 1,000 and 4,000 turns. The optimum of turns for the particular circuit configuration described herein was approximately 1,500. When there is a ground fault current of 5 milliamperes, a voltage of approximately 10 millivolts is developed across the sensing winding 109 and this voltage appears across the resistor R1.

In a typical application, the core 108 of the differential sensing transformer T1 may comprise about nine ring laminations stacked in a protective nylon box. Each of these high nickel content steel rings may have an inner diameter of approximately 0.375 inches and an outer diameter of approximately 0.5 inches and a thickness of 0.014 inches. The sizes given are for a ground fault indicating circuit which is designed to pass a maximum current of approximately 20 amperes. The primary windings of the transformer T1 must be capable of carrying the maximum current of the conductors L and N and, therefore, No. 14 AWG wire is required. Ground fault indicating circuits for either larger of smaller maximum currents may be designed with appropriate changes in dimensions and wire sizes. For the example given, the sensing wire will carry very little current and No. 40 AWG wire will be adequate.

It is desirable to have the ground fault indicating circuit 101 not respond to a ground fault current of less than 2 milliamperes and positively respond when the ground fault circuit reaches 5 milliamperes. However, it is possible that an inadvertant direct short between the L and N conductors will occur at the load end and result in a very large unbalanced current flow in the primary windings of the differential sensing transformer T1. A large unbalance in the primary windings of the sensing transformer T1 may result in the core being driven well up into magnetic saturation and cause it to take a set at a point of high remanent flux density which may impair the sensitivity of the ground fault indicating circuit. To protect the transformer T1 from this danger, the diodes D1 and D2 are coupled across the output of the sensing winding 109.

The ground fault indicating circuit 101 also includes a power and neutral transformer T2 which provides a dual function. One winding will be seen to comprise three sections 110, 111 and 112. The sections 110 and 111 will be seen to be in series with resistor R2 and the combination bridged from the live conductor L to the neutral conductor N. The junction point between winding sections 110 and 111 is coupled as an input to bridge circuit 114 comprising diodes D3, D4, D5 and D6. The lower end of the winding 112 is connected as the other input to bridge 114. The windings 110, 111 and 112 act as an auto-transformer.

The transformer T2 also serves as a power source for a circuit which senses a grounded neutral at the load end. Considering now more specifically the neutral lead N of the power source it will be seen that after passing through the transformer T1 it includes winding 115 of transformer T2 and extends to the load 104 where it is still designated as the N conductor. It will be obvious that if there is a resistance ground 116 connected to the live conductor L at the load end, there will be a flow of current from the power source on the L conductor through transformer T1 and to ground through the resistance ground 116. This will cause the current in the live conductor L to be greater than the current in the neutral conductor N and a potential will be induced in the sensing winding 109; and in the manner to be shown, this will actuate the disconnect device 102. If a ground 117 should exist on the neutral conductor N simultaneously with the resistance ground 116 on the live conductor L, there would be a tendency to desensitize the system if it were not for the circuit to be described. More specifically, at least part of the excess current flowing in the L conductor and passing through the resistance ground 116 could return to the power source through the ground 117 and the neutral conductor N. This would tend to increase the current in the N conductor and thereby desensitize the system. That is, the increased current in the N conductor would at least partially compensate for the increased current in the L conductor. However, the winding 115 of transformer T2 raises the potential of the neutral conductor N at the load end by a very small amount. Therefore, if the load end of the neutral conductor N is inadvertently grounded, a current will flow from the ground 105 at the power source through the toroidal core 108, the winding 115 of transformer T2, the neutral conductor N to ground 117 and back to the ground 105. The leakage current flowing in the neutral conductor will induce a potential in the sensing winding 109. The transformer T2 is so designated that the signal produced in response to a grounded neutral wire (at the load end) will be in a generally additive phase relationship with the differential signal due to a resistance ground on the live conductor, if one should exist simultaneously. The transformer T2 is so designed that the loss in sensitivity discussed above is fully compensated according to the method of evaluation given in UL 943 Paragraph 20.4.

The auto-transformer section of transformer T2 provides sufficient voltage to develop a $+12$ volt and a $-12$ volt signal, with respect to the neutral, at the output terminals 118 and 119, respectively, of the bridge 114. Voltage regulation of the output of the bridge 114 is provided by zener diodes Z1 and Z2 conducting through source resistor R2. The mid-point of the zener diode Z1 and Z2 is connected directly to the neutral conductor N between transformer T1 and T2. Capacitor C1 bridged across the output of bridge 114 is a bypass for high frequency transients which would otherwise tend to cause nuisance tripping. Capacitor C1 has high reactance at the ripple frequency of 120 Hertz. Accordingly, the bridge 114 provides pulsating direct current voltage dropping nearly to zero volts between pulses. The direct current output of the bridge 114 is available with negligible delay when the line voltage is turned on. The $+12$ and the $-12$ volt output of the bridge 114 serves as a power supply for the operational amplifier A1.

The operational amplifier A1 may comprise an integrated circuit such as Part No. LM307N as manufactured by the Fairchild Company. Since the operational amplifier A1 is a standard component, its interior operation will not be discussed and only the leads connected to it as controls, inputs and outputs will be described. As already mentioned, the bridge 114 provides a $+12$ volt and $-12$ volt operating potential to the operating amplifier A1. The operational amplifier has two input leads; an inverting and a non-inverting input designated 120 and 121, respectively. The operational amplifier A1 is a high gain amplifier and is used to amplify the signal available from the differential transformer T1. Phasing of the transformer T1 and the grounded neutral winding of transformer T2 must be such that a ground fault produces a voltage at the non-inverting input 121 of the operational amplifier A1 which is in phase with the power source.

As may be seen, the left hand lead of sensing winding 109 is connected directly to the non-inverting input 121. The right hand lead of the sensing winding 109 is connected to the inverting input 120 through capacitor C2 and resistor R3. The value of capacitor C2 is such that its impedance is low compared to the resistance to R1. Bridged between the inverting input 120 and the output 122 is a parallel circuit comprising a capacitor C3 and a resistor R4. The value of capacitor C3 is such that its impedance is high compared to the resistance of R4. According to standard formulas for the amplification of operational amplifiers of the type used, the amplification is approximated by the ratio of (R3+R4) R3. Because it is desired to have the disconnect device 102 respond to ground faults approximating 5 milliamperes or more, the values of R3 and R4 have been selected such that a ground fault current of 5 milliamperes or more will drive the operational amplifier A1 to approximately its maximum availabile peak output voltage.

The purpose of capacitor C2 is to minimize direct current offset at the output 122 of the amplifier A1. The direct current voltage gain of the circuit is approximately equal to unity. With the amplifier input held at an average value of zero volts direct current, by connection to the neutral through transformer T1, the direct current component of the amplifier output voltage will be within a few millivolts of zero.

Capacitor C3 causes the amplifier gain to fall off at frequencies above 60 Hertz in order to discriminate against unwanted noise and transients which could cause nuisance tripping. In a similar manner, capacitor C4 is connected in parallel with the resistor R1 to provide a low impedance path for unwanted noise and transient output currents from the transformer T1.

The output of operational amplifier A1 is delivered on lead 122 to a triggering circuit comprising a silicon controlled rectifier, SCR, via a diode D7 and a zener diode Z3. A ground reference at the gate of the SCR is maintained by resistor R5 which is coupled between the gate of the SCR and the N conductor.

To develop a voltage at the gate of the SCR which is sufficient to trigger it to conduction, the positive output voltage of the amplifier A1 must be sufficient to cause conduction through diode D7, zener diode Z3 and resistor R5 to the neutral conductor N. In one particular embodiment of the invention, this required about a 7 volt output. The components and values are selected so that a ground fault current of 5 milliampere or more will be adequate to develop a sufficient gate voltage to trigger the SCR into conduction. However, when the ground fault current is 2 milliamperes or less, no appreciable signal is applied to the gate of the SCR. This prevents what is known as nuisance tripping. In series with the main conduction path of the SCR is an actuator 107. Accordingly, when the SCR is rendered conducting by the application of an appropriate potential to its gate, current will flow from the live conductor L through the actuator 107 and the SCR to the neutral conductor N. Triggering the SCR "on", causes the actuator 107 to operate and move the armature 106 to thereby interrupt the flow of power from the power source to the load 104. This will interrupt the flow of power and terminate any current which may be flowing in the resistance ground 116; a circuit which may comprise a human body. The disconnect device 102, when actuated, will remain actuated until it is manually reset. Capacitors C5 and C6 minimize the probability of false triggering of the SCR due to line voltage transients.

A ground fault which occurs when the power line potential is near its positive peak will trigger the SCR instantaneously. However, if a fault occurs late in the positive half cycle or during the negative half cycle, tripping will not take place until the next positive half cycle. Since the period for each cycle, at 60 Hertz, is approximately 16 milliseconds, actuation of the disconnect device 102 will occur well within the Underwriters Laboratory requirement of 25 milliseconds. Where higher speed tripping is required, a triac rated for both first and third quadrant operation may be substituted for the SCR and a zener diode would replace the diode D7.

The switch 103 provides means for testing the operation of the ground fault indicator 101 and the disconnect 102. When the switch 103 is closed, a circuit is completed from ground 105 at the power source through resistor R6, switch 103 and the L conductor to the power source. The current in the L conductor of this circuit generates a magnetomotive force in the differential transformer T1; but there is no compensating current in the N conductor that threads the differential transformer T1. Accordingly, a potential is generated across winding 109 of differential transformer T1 and this results in operation of the disconnect 102 in the manner described previously. Resistor R6 has a value which will cause a current of approximately 5 milliamperes to flow. Failure of the disconnect 102 to operate would indicate a malfunction. The switch 103 may be operated with or without a load 104 connected between the L and N conductors.

The circuit components used are very small and could be mounted with a circuit breaker in a power distribution panel if an entire branch circuit is to be protected. Or the components could be combined with a wall outlet and mounted with the outlet in the box recessed in the wall if only appliances plugged therein are to be protected. Or the components could be in a small box that plugs into a wall outlet and with a protected outlet on the small box if it is desired to have portability.

A circuit using components having the values listed below was found to give satisfactory results for the conditions described.

C1 and C5 0.1 microfarads
C2 4.7 microfarads
C3 0.001 microfarads
C4 0.033 microfarads
C6 0.1 microfarads
D1, D2, D7 General Instrument diode IN4001
Bridge 114 General Instrument No. WO2M
R1 4.7 kilo ohms
R2 33 kilo ohms
R3 1.2 kilo ohms
R4 1.2 meg ohms
R5 470 ohms
R6 18 kilo ohms
SCR GE No. C106C7
Z1 & Z2 IN5242
Z3 IN754

The trip level requirement at 5 milliamperes maximum is defined by Underwriters Laboratory Standard for Safety No. 943. As also required by that standard, the device is not to trip at a level of approximately 2 milliamperes or due to power line transients or disturbances.

While there has been shown and described what is considered at present to be the preferred embodiment of the invention, modifications thereto will readily occur to those skilled in the related arts. For example, with the substitution of a different transformer T1, the circuit could be made to work with three phase circuits or instead of an SCR, the trigger potential could be used to bias a transistor to conduction. It is believed that no further analysis or description is required and that the foregoing so fully reveals the gist of the present invention, that those skilled in the applicable arts can adapt it to meet the exigencies of their specific requirements. It is not desired, therefore, that the invention be limited to the embodiments shown and described, and it is intended to cover in the appended claims all such modification as fall within the true spirit and scope of the invention.

What is claimed is:

1. A protection device responsive to a ground fault current comprising in combination:
   a. a differential sensing transformer having first and second primary windings in series, respectively, with the live and neutral conductors supplying power from a power source to a load;
   b. a second transformer having one winding in series with said neutral conductor and having a second winding with a part thereof coupled across said live and neutral conductors as an auto-transformer;
   c. a diode bridge having its input supplied by said auto-transformer and its output coupled to an operational amplifier as a power supply therefor;
   d. a sensing winding on said differential sensing transformer responsive to a difference of current in said live and neutral conductors for providing an input to said operational amplifier;
   e. a disconnect actuating means coupled across said live and neutral conductors and responsive to an output from said operational amplifier for disconnecting said live conductor from said load; and
   f. control means coupled between the output of said operational amplifier and said disconnect actuating means for controlling the magnitude of the output signal from said operational amplifier to which said disconnect actuating means responds.

2. The combination as set forth in claim 1 wherein said control means comprise diodes.

3. The combination as set forth in claim 1 and including surge current suppression means coupled between said sensing winding and said operational amplifier for rendering said operational amplifier substantially insensitive to surge currents in said live and/or neutral conductors.

4. The combination as set forth in claim 1 and including feedback and amplification control means coupled between the input and output of said operational amplifier.

5. The combination as set forth in claim 1 and including the anode and cathode of an SCR in series with said disconnect means and a control gate on said SCR which is coupled to the output of said operational amplifier so that said SCR is rendered conductive in response to a signal exceeding a predetermined magnitude from said operational amplifier.

6. A ground fault circuit interrupter for connection in a power distribution system having a neutral conductor and a live conductor extending from an alternating current source to a load, the neutral conductor being intentionally grounded at the source, which comprises:
   a. a differential transformer having a first primary winding connected in series with the live conductor, a second primary winding connected in series with the neutral conductor, and a secondary winding adapted to produce a fault signal when the current in the live conductor is not equal to the current in the neutral conductor;
   b. a power transformer including a primary winding having first and second taps thereon and a secondary winding, the primary winding of the power transformer having one end connected with one end of a current limiting resistor, the other end of said resistor being connected to the live conductor between the differential transformer and the load;
   c. a bridge rectifier connected across the first tap and the other end of the primary winding of the power transformer for providing a d.c. potential;
   d. the second tap, located between the first tap and said other end of the primary winding of the power transformer, and with said second tap connected to the neutral conductor whereby the positive and negative terminals of said d.c. potential are positive and negative, respectively, respect to said neutral conductor;
   e. the secondary winding of the power transformer being connected in series with the neutral conductor for producing a current therein when the neutral conductor is grounded at a point between the secondary winding of the power transformer and the load, said current serving to produce a current unbalance in the live and neutral conductors causing said fault signal to be produced across the secondary winding of the differential transformer;
   f. amplification means having a power input circuit connected to the output of said bridge rectifier, said amplification means having an output circuit and being responsive to the fault signal for producing a control signal; and
   g. level detection means having an input circuit coupled to the output of said amplification means and being responsive to the control signal to produce a triggering signal when the control signal exceeds a predetermined level.

7. A ground fault detector as in claim 6, in which the amplification means further comprises:
   a. a high gain operational amplifier having an output circuit and a feedback loop; and
   b. impedance means connected in the feedback loop for attenuating signals at frequencies above the frequency of the source.

8. A ground fault detector as in claim 6, further comprising:
   a. protection means connected across the output of the secondary winding of said differential transformer for protecting the amplification means from relatively high frequency transient voltages; and
   b. filtering means connected in parallel with the protection means for attentuating unwanted noise and transient signals at frequencies above the frequency of the source.

9. A ground fault detector as in claim 6, in which the level detection means comprises:
   a. means for rectifying the fault signal; and
   b. a zener diode for establishing the predetermined level.

10. A ground fault detector as in claim 6, further comprising:
   a. solid state switching means responsive to the triggering signal and connected to the output of the level detection means for being switched into its conductive state.

* * * * *